United States Patent [19]

Elliott et al.

[11] Patent Number: 4,604,934

[45] Date of Patent: Aug. 12, 1986

[54] CARRIAGE TRAIN PRECISION LINEAR POSITIONING SYSTEM

[75] Inventors: Martin R. Elliott, Austin, Tex.; Dwight A. Bollinger, Mt. Zion, Ill.; Kris B. Curry; Daniel C. Plocik, both of Decatur, Ill.

[73] Assignee: PPG Industries, Inc., Pittsburgh, Pa.

[21] Appl. No.: 732,040

[22] Filed: May 8, 1985

[51] Int. Cl.$^4$ .............................................. C03B 33/02
[52] U.S. Cl. ........................................ 83/880; 83/884; 83/425.4; 83/498
[58] Field of Search .............. 83/880, 884, 885, 425.4, 83/498, 499

[56] References Cited

U.S. PATENT DOCUMENTS

| | | | |
|---|---|---|---|
| 3,515,020 | 6/1970 | Dryon | 83/884 |
| 3,834,258 | 9/1974 | Zumstein | 83/11 |
| 4,072,887 | 2/1978 | Buschmann et al. | 83/884 X |
| 4,170,159 | 10/1979 | McNally | 83/425.4 X |
| 4,516,454 | 5/1985 | Mosburger | 83/425.4 X |
| 4,548,109 | 10/1985 | Tokuno et al. | 83/425.4 X |

Primary Examiner—Donald R. Schran
Attorney, Agent, or Firm—Robert A. Westerlund, Jr.

[57] ABSTRACT

A system for positioning a plurality of carriages to preselected positions across a supported article includes moving a train of detachably interconnected carriages with an engine carriage functionally connected to a driving facility, and simultaneously detaching selected ones of the carriages from the train at predetermined positions across the article, in a sequential manner, beginning with the selected carriage farthestmost from the engine carriage, and holding the selected carriages to a member bridging the article. The positioning cycle is completed by stopping the engine train at its preselected position. Thereafter, a work operation is performed on the article by moving a work operation performing means associated with each of the selected carriages from an inoperative or retracted position to an extended or operative position.

20 Claims, 7 Drawing Figures

CARRIAGE TRAIN PRECISION LINEAR POSITIONING SYSTEM

FIELD OF INVENTION

This invention relates generally to a positioning system, and more particularly, to a system for positioning a plurality of carriages along a bridge which extends across a work surface.

BACKGROUND OF THE INVENTION

In a float glass manufacturing plant, a continuous float glass ribbon is produced. After the ribbon is sufficiently cooled or annealed, it is cut both transversely and longitudinally to form glass sheets of predetermined sizes. The longitudinal cutting, sometimes referred to as "slitting", is generally performed by glass cutting assemblies, supported transversely across the path of travel of the glass ribbon.

U.S. Pat. No. 3,834,258 issued to Ernst Zumstein, teaches an apparatus having a plurality of cutting assemblies mounted to carrier units which are displaceable, by a pusher rod driven by a stepper motor, along a guide rail extending transversely across a work surface which supports a plate of glass to be cut. The individual carrier units are connected through disengageable clutches with the pusher rod at preset distances from one another. Each carrier unit has friction braking means actuatable for generating a braking force greater than the holding force of the clutch which holds the carrier unit to the pusher rod, to thereby disengage the clutch and hold the carrier unit to the guide rail at a preselected location across the work surface. After all of the carrier units are positioned, their associated cutting assemblies can be actuated to longitudinally cut or score the glass plate. A disadvantage with the apparatus taught in U.S. Pat. No. 3,834,258 is that the individual carrier units and their associated cutting assemblies operate in individual, non-overlapping zones. This unduly restricts the longitudinal cutting pattern which can be imposed on the glass plate. For example, this presents a problem when narrow faults extend longitudinally through a glass sheet, e.g. near the edge(s) thereof, where it is desirable to have cutting assemblies which can be operated relatively close together in the same zone for cutting out the narrow fault. Further, to minimize lost production time it is desirable to be able to move a cutting assembly into the position of a worn-out or malfunctioning cutting assembly while it is being replaced or repaired. For these reasons, a positioning apparatus wherein the cutter assemblies are limited to movement within fixed, non-overlapping zones is disadvantageous.

U.S. Pat. No. 4,170,159, issued to Paul McNally, teaches a linear positioning apparatus which overcomes the above-delineated disadvantages of the Zumstein positioning apparatus. McNally, in his patent, teaches a movable carriage which is connected to a smooth actuating rod for movement therewith to a desired position where it is locked to a fixed bridge, permitting the actuating rod to move with respect thereto. The movable carriage is clamped to the actuating rod with a continual friction force which is easily overcome by the force with which the carriage is locked to the fixed bridge. When more than one carriage is utilized, adjacent carriages can be moved close together. Otherwise stated, movement of the carriages is not restricted to preselected zones. Positioning of the carriages is computer controlled. The positions of all carriages are stored and a carriage can be moved to a new position without returning to a fixed home position. This permits individual carriages to be quickly and easily shifted and also permits an entire cutting pattern set up to be shifted as a unit. The linear positioning apparatus taught by U.S. Pat. No. 4,170,159 is expensive to manufacture and to maintain and is also complex in operation.

When a cutting pattern is desired to be changed it is oftentimes not necessary to have the capability to shift the position of each cutting assembly carriage independently or individually, without returning each carriage to a fixed reference or home/base position. This is primarily because the time which is required to return all of the carriages to the home position, then to set up a new cutting pattern, and finally, to move the carriages into position to perform the desired/selected cutting pattern, is less than the time that is available before cutting must be resumed. Therefore, the apparatus taught in U.S. Pat. No. 4,170,159 is unnecessarily complex and expensive to build, operate and maintain when the time frame parameters of the cutting operation do not require that the cutting assembly carriages be independently movable, as above-discussed. McNally teaches a friction clamping means comprising brass wear pads biased by spring steel members to continually engage the actuating rod. The wear pads are susceptible to wear-out, thereby necessitating replacement of the worn-out pads. Further, detection of the worn out condition of the wear pads may be difficult and even slightly worn pads may create the problem of slippage or undesired relative movement of the associated carriage and the actuating or positioning rod, which could cause the carriage(s) to be mispositioned or misaligned for the desired cutting pattern. Further, the method taught by McNally for positioning the carriages, is to utilize a programmed computer controller to move the actuating rod and then disengage each carriage therefrom by applying the locking means to hold the associated carriage to the fixed guide rail at a preselected position across the work surface in accordance with the cutting pattern established in the computer program. When a change in the cutting pattern is to be effected, the holding means associated with any one or more of the carriages which must be shifted to effect the modified cutting pattern, is released, thereby enabling the affected carriage(s) to move unitarily with the actuating rod until its new position is reached, at which juncture, the holding means is again actuated to hold the associated carriage to the guide rail at the new position. All of the above events are controlled by the computer controller pursuant to programmed instructions. The complexity of the computer controller and program logic is much greater than a positioning method which does not have independently movable carriages.

It would be advantageous and desirable to have a linear positioning system which eliminates the drawbacks and shortcomings of the apparatus of U.S. Pat. Nos. 3,834,258 and 4,170,159.

SUMMARY OF THE PRESENT INVENTION

The present invention relates to an apparatus for positioning a plurality of carriages from a home position to preselected work positions along a fixed, elongated bridge or brake bar which extends across a work surface. The endmost or engine/lead carriage nearest to the direction of movement of the carriages out of home position is directly, functionally connected to a driving facility. The lead and remaining or trailing carriages are detachably secured to each other to provide a "train" of carriages which are detachably interconnected, with the engine carriage being movable by the driving facility to move the train across at least a portion of the work surface. Each of the carriages, except the engine carriage, is equipped with a brake or holding facility which is actuatable for holding the associated trailing carriage to the brake bar. A programmable controller governs the movement of the engine carriage across the work surface and the operation of the brake of each trailing carriage. Each trailing carriage which is required for a particular operating cycle, beginning with the endmost trailing carriage, is automatically detached or disengaged from the carriage train, by the controller, at a preselected position along the brake bar (i.e. at a preselected position across the work surface), and simultaneously, or just prior to the disengagement of the carriage from the train, its associated brake is automatically actuated to hold the associated carriage to the brake bar at the preselected position. When the engine carriage has reached its preselected position, the driving facility is automatically disactuated by the controller and the carriage positioning or setup cycle is completed.

The present invention also relates to a method for positioning a plurality of carriages into a predetermined configuration across a work surface. The method of the present invention includes detachably interconnecting a plurality of carriages to form a carriage train on a structure extending across a work surface, moving the endmost or engine carriage nearest to the direction of movement of the carriages to drive the train across the work surface, and at selected positions across the work surface, detaching selected one(s) of the trailing carriages, beginning with the endmost trailing carriage, from the carriage train, and detachably securing each carriage to the structure, as or just prior to the time it is detached. After the trailing carriages have been detachably secured to the structure at their individual preselected positions, the engine carriage is moved into its preselected position and stopped thereat, thereby completing the positioning of the carriages into the predetermined configuration.

DESCRIPTION OF THE PRESENT INVENTION

Figure 1:
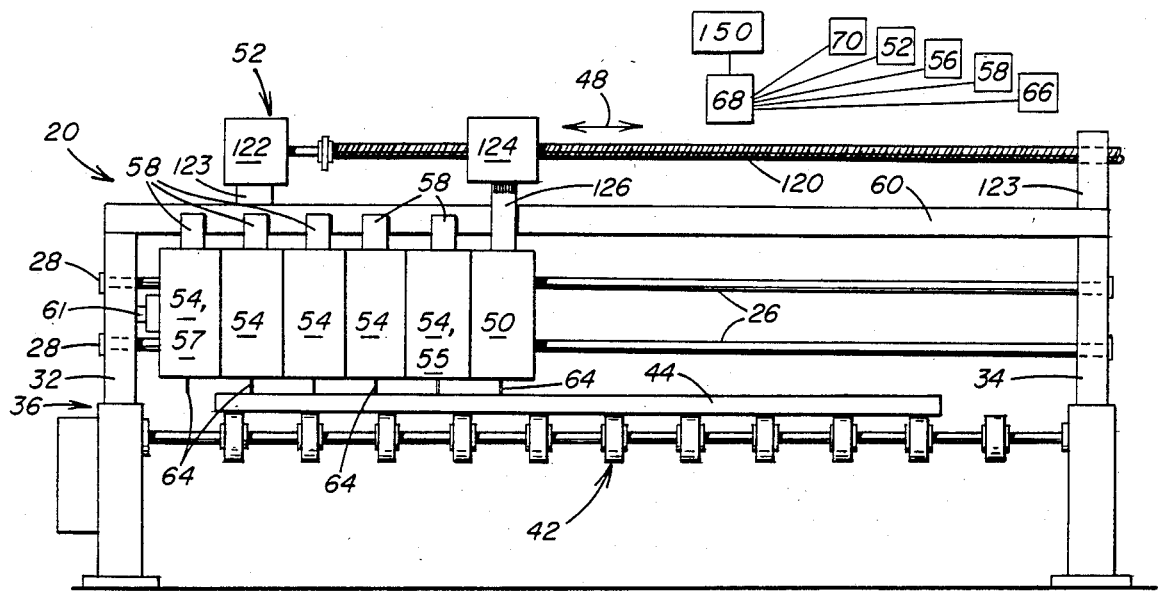
FIG. 1 is a diagrammatic, end, elevational view of the carriage train positioning apparatus of this invention with the carriages in their fixed reference or home position.
Figure 3:
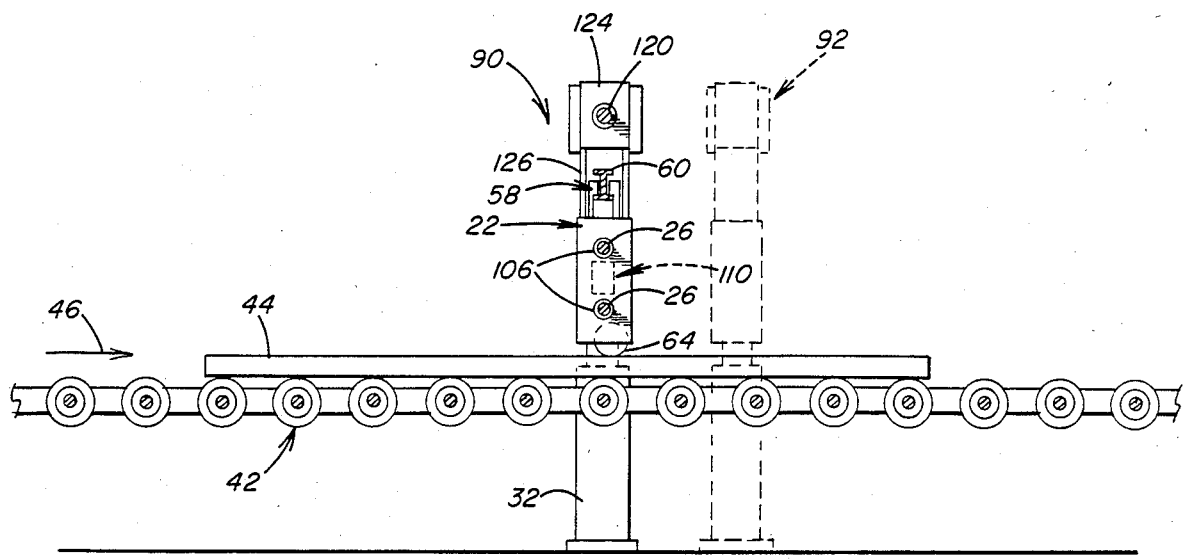
FIG. 3 is a diagrammatic, side, elevational view of the positioning apparatus of this invention, with portions removed for purposes of clarity.

Referring now to the drawings, and more particularly to FIG. 1, there can be seen a diagrammatic representation of a carriage positioning apparatus 20 embodying features of the present invention. A plurality of cutting assembly carts or carriages 50, 54, are interconnected to form a carriage "train," the carriages being shown in their home or fixed reference position in FIG. 1. The carriages 50, 54 are supported for reciprocal movement on guide-support rails 26 which are attached to upright support posts 32, 34 of a structure 21 spanning over a conveyor superstructure 36. Although not limiting to the invention, the conveyor can suitably be a roll-type conveyor 42 for moving a continuous glass ribbon, a glass sheet 44, or any other convenient workpiece along a longitudinal sheet movement path indicated by the directional arrow 46 (See FIG. 3). Therefore, the carriages 50, 54 are guidably supported by the rails 26 for reciprocable movement along a carriage movement path 48 transverse to the longitudinal sheet movement path 46 (See FIG. 3).

Figure 2:
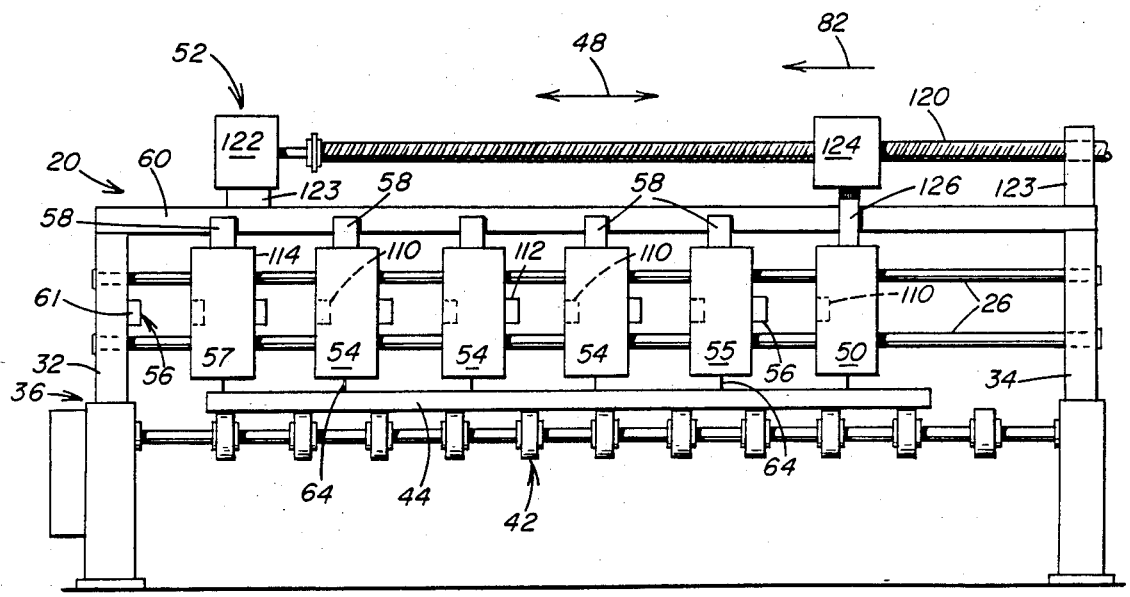
FIG. 2 is the same view as FIG. 1, illustrating the carriages positioned in cutting positions after a positioning cycle.
Figure 5:
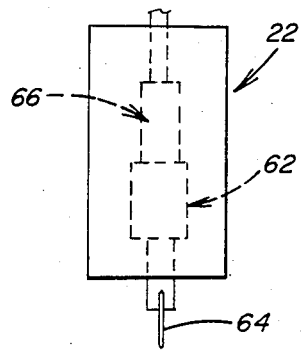
FIG. 5 is a diagrammatic, elevational view of a carriage showing its associated cutting assembly mounted thereto.

With continued reference to FIG. 1, the endmost carriage 50 nearest to the carriage movement path 48 (i.e. the first carriage out of home position), hereinafter referred to as the lead or engine carriage, is directly, functionally connected to a driving facility 52, to be discussed below. The remaining or trailing carts or carriages 54 are detachably interconnected together by interconnecting mechanisms 56, as can be seen diagrammatically in FIG. 2, with the trailing carriage 55 immediately adjacent to the engine carriage 50 being detachably interconnected by an interconnecting mechanism 56 to the engine carriage 50, to thereby complete the carriage train, as shown in FIG. 1. Each of the trailing carriages 54 has a holding or braking device 58 associated therewith, each braking device 58 being selectively actuatable to hold the associated trailing carriage to an elongated brake bar 60 which extends transversely across the conveyor 42 and which is connected at its opposite ends to the upright members 32 and 34. The upright members 32 and 34 and the brake bar 60 form the support structure 21. With reference to FIG. 5, each of the carriages 50, 54 carries or supports a cutting assembly 62 or other suitable tool (not shown) adapted to perform a work operation(s) on the glass sheet 44 or other suitable workpiece (not shown), respectively. Each cutting assembly 62 has a cutting or scoring wheel 64 which is selectively movable by a cutting wheel actuating means 66 from an inoperative or retracted position above the glass sheet 44 to an extended or operating position bearing against/in cutting engagement with the upper surface of the glass sheet 44 to impose a longitudinal slit or score/cut line on the longitudinally moving sheet 44, and vice versa. Referring back to FIGS. 1 and 2, each of the carriage interconnecting mechanisms 56, each of the braking devices 58, each of the cutting wheel actuating means 66, and the driving facility 52 are preferably functionally connected to a programmable controller 68, which is conveniently interfaced to a suitable input/output or I/O control monitor 70 or the like. The controller 68 is preferably preprogrammed to receive digital data input via the control monitor 70 and convert this digital information into analog information which is output to the driving facility 52, the carriage interconnecting mechanisms 56, the braking devices 58, and the cutting wheel actuating means 66 to automatically control or operate each of the above-delineated components of the positioning apparatus 20 in accordance with the data input. The data input typically consists of information defining the parameters of the cutting pattern to be performed on the moving glass sheet 44, which can suitably be a continuous float glass ribbon (not shown) within the context of a float glass manufacturing plant.

Although not limiting to the invention, a typical positioning or cutting cycle would include the following:

The desired cutting pattern to be performed on the glass sheet 44 is defined by a digital data base input into the preprogrammed controller 68 via the I/O control monitor 70. The controller 68 automatically processes the digital input data in accordance with the instructions of the program which has been preprogrammed thereinto and converts it into analog information which is automatically output to the driving facility 52, the carriage interconnecting mechanisms 56, the braking devices 58 and the cutting wheel actuating means 66. At the start of the cycle, the carriages 50, 54 are in the trailing home position as shown in FIG. 1, with the trailing carriage 57 opposite the engine carriage 50 detachably interconnected to interconnecting mechanism 56 associated with physical stop 61 disposed between the support rails 26, and all of the carriages 50, 54 are detachably interconnected by the carriage interconnecting mechanisms 56 to form a carriage train. Also, at the start of the cycle, each cutting wheel actuating means 66 is disactuated, thereby putting the cutting assembly 62 of each carriage 50, 54 in the retracted, or inoperative position. The analog output from the controller 68 deactuates the interconnecting mechanism 56 associated with the physical stop 61, and actuates the driving facility 52 to move the carriage train 24 transversely across the glass sheet 44, with the engine carriage 50 pulling the trailing carriages 54 and 57. The trailing carriage 57 opposite the engine carriage 50, and thereafter each carriage 54 which is required to be employed to effect the particular cutting pattern input into the controller 68, is automatically detached or uncoupled from the carriage train 24 in any convenient manner. For example, the driving facility 52 is automatically momentarily disactuated by the controller 68, when a carriage 54 farthestmost from the engine carriage 50 has reached the preselected position whereat it is to be employed in accordance with the parameters of the input cutting pattern, and simultaneously with, or just prior to disactuation of the driving facility 52, the carriage interconnecting or coupling mechanism 56 associated with the farthestmost carriage 54 is automatically disactuated by the controller 68, to thereby automatically detach or uncouple the selected carriage 54 from the carriage train 24, and the braking device 58 associated with the selected carriage 54 is automatically actuated, to thereby hold the carriage 54 to the brake bar 60 at the preselected position whereat it is to be employed. Thereafter, the driving facility 52 is actuated by the controller 68 to thereby move the train 24 until the next carriage 54 farthestmost from the engine carriage 50 to be employed in the cutting pattern reaches its destination. The driving facility 52 is then disactuated and the carriage 54 uncoupled and secured to the brake bar 60 in the same manner as discussed hereinabove. This procedure is repeated for each trailing carriage 54 selected for the input cutting pattern. After all of the selected trailing carriages 54 have been positioned in the above manner, the controller 68 automatically disactuates the driving facility 52 when the engine carriage 50 has reached the position across the glass sheet 44 whereat it is to be employed in accordance with the input cutting pattern, thereby stopping the engine carriage 50 thereat, to complete the positioning of the carriages 22 across the glass sheet 44.

Figure 6:
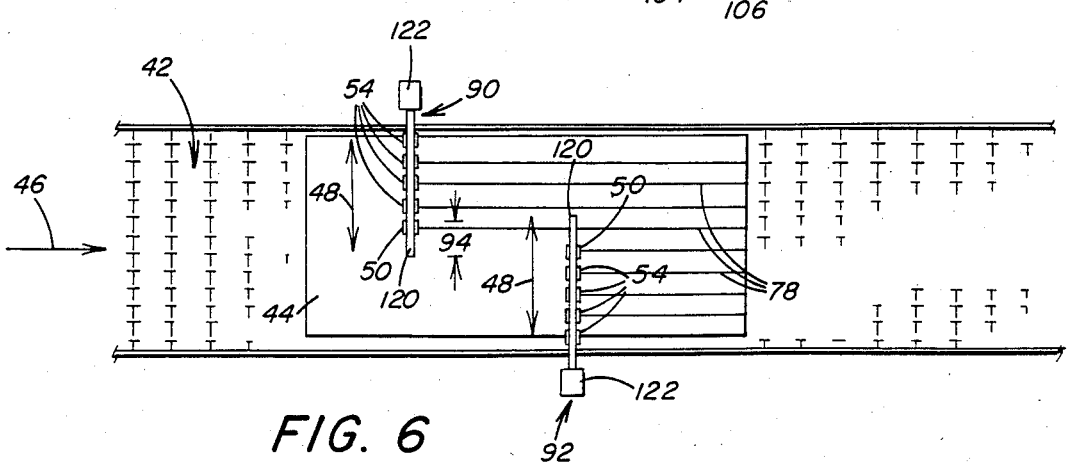
FIG. 6 is a plan view, diagrammatic illustration of the overlapping driving facilities of the preferred positioning apparatus of this invention, with portions removed for purposes of clarity.

After the carriage positioning cycle is completed, the glass sheet 44 moving along the conveyor 42 is ready to be cut in accordance with the preselected/input cutting pattern. In order to effectuate the input cutting pattern, the controller 68, via analog output, automatically actuates the cutting wheel actuating means 66 associated with each of the selected carriages 50, 54 which are required to effectuate the input cutting pattern, to move the associated scoring wheels 64 from the retracted or inoperative position into an extended or operative position against/in direct contact with the upper surface of the glass sheet 44, under a predetermined downwardly directed scoring load or force, to impose the input cutting pattern on the moving glass sheet 44, which is manifested as an array of parallel longitudinal score lines 78, as shown in FIG. 6. As can now be appreciated, if less than the total number of carriages 50, 54 are required for the cutting pattern, only that number of carriages 50, 54 need make up the carriage train. The carriages 54 not needed to effect the cutting pattern may be held in the home position by the interconnecting mechanisms 56 associated with the physical stop 61 and the unneeded ones of the carriages 54.

When a cutting cycle has been completed or when it is desired to change or modify the cutting pattern, (i.e. when it is desired to reposition the carriages 50, 54), the controller 68, via command instructions input into the I/O control monitor 70, automatically actuates the cutting wheel actuating means 66 associated with each selected carriage 50, 54 to move the cutting wheel 64 upwardly into its retracted or inoperative position out of contact with the upper surface of the glass sheet 44, and automatically disactuates the braking device 58 associated with each selected trailing carriage 54. The controller 68 then automatically actuates the driving facility 52 to move the engine carriage 50 in the direction 82 opposite to the direction it is moved for a positioning cycle. The engine carriage 50, during the course of its travel towards the physical stop 61, positively engages the trailing carriage 55 nearest thereto, which is then driven by the engine carriage 50 into positive engagement with the next nearest trailing carriage 54, and so on until the trailing carriage 57 opposite the engine carriage 50 is driven into positive engagement with the physical stop 61. After the carriage train is thus completed at its home position, all of the coupling mechanisms 56 are automatically actuated by the controller 68, to facilitate unitary movement of the train for the next positioning cycle, which is executed in the manner hereinbefore described.

It is preferable, although certainly not limiting to the invention, that the carriage positioning apparatus of this invention comprises first and second apparatuses 90, 92, respectively, as shown diagrammatically in FIG. 6, each identical to the apparatus 20, hereinbefore described. The purpose of this arrangement is to minimize the time required to complete a positioning cycle. The first and the second carriage positioning apparatuses 90, 92 are disposed on opposite sides of the conveyor 42. The brake bar 60 and the guide-support rails 26 can suitably be common to both apparatuses, 90 and 92, although this is not the case with the embodiment shown in FIG. 6 due to the spacing apart of the apparatuses 90, 92. However, a separate driving facility 52 is required for each apparatus 90, 92, because the engine carriage 50 of the carriage train of each apparatus 90, 92 must be independently driven. However, the programmable controller 68 is preferably capable of simultaneously, independently controlling the positioning cycle of each of the apparatuses 90, 92 with no adverse effect on carriage positioning accuracy. Further, the engine carriage 50 of each of the apparatuses 90, 92 preferably has a carriage movement path 48 encompassing slightly more than one-half of the width of the conveyor 42, thereby providing a slight overlapping zone 94 at the middle of the conveyor 42.

Figure 4:
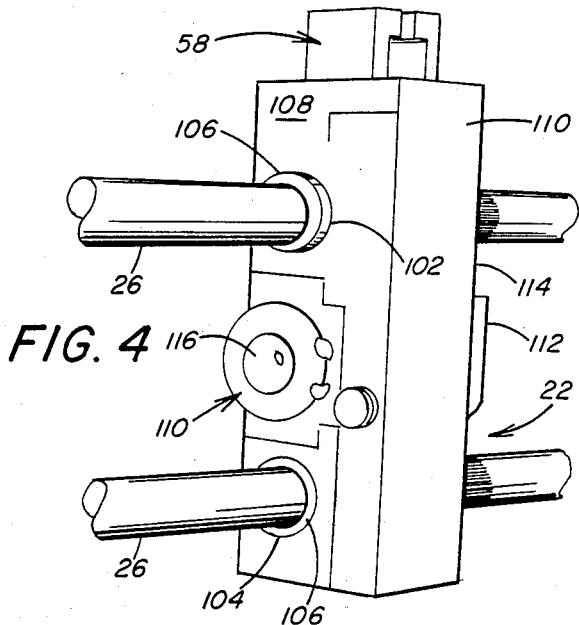
FIG. 4 is a perspective, fragmentary view of a carriage slidably mounted to linear ball bearing ways with portions removed for purposes of clarity.

Referring now to FIG. 4, each carriage 50, 54 can be seen to comprise a generally rectangular member 100, which can suitably be a machined steel block, having a pair of parallel-disposed bores 102, 104 near the top and bottom thereof, respectively. A bushing or ball bearing sleeve 106 is mounted within each bore 102, 104 to extend the full length thereof. Intermediate the bores 102, 104, a first part 110 of the interconnecting mechanism 56 associated with the carriage 50, 54 is mounted to the side wall 108. A second part 112 (see FIG. 2) of the interconnecting mechanism 56 is mounted to the adjacent side wall 114 of the adjacent carriage 50, 54, intermediate its bores 102, 104. The first part 110 is preferably an electromagnet, e.g. of the type sold by Ledex Corp., which is actuatable and disactuatable by the programmable controller 68 or other suitable controlling means functionally interfaced with the controller 68. The second part 112 is preferably a steel boss or male clutch part 112 which is adapted to cooperatively engage socket 116 formed in the adjacent electromagnet 110. When the electromagnet 110 is energized or actuated, the adjacent boss 112 received by the electromagnet socket 116 is held by the electromagnetic force generated by the electromagnet 110. The electromagnet 110 part of the interconnecting mechanism 56 between the engine carriage 50 and the trailing carriage 55 adjacent thereto must be capable of generating an electromagnetic force sufficient to overcome the frictional force of the bearing sleeve 106 engaging the guide rails 26 which pass through the bores 102, 104, plus the weight of all of the trailing carriages 54 in the carriage train while being driven through the carriage movement path 48. The tubular rails 26 can suitably be Thompson linear ball bearing ways, e.g. twin Thompson tubular rails or shafts of the type sold by Lintech Corp. In order to facilitate a uniform shift of all carriages 50, 54 employed in a particular cutting pattern, e.g. due to slight skewing of the glass sheet 44 on the conveyor 42, the ways 26, the brake bar 60 and the driving facility 52, are preferably unitarily movable to shift the entire cutting pattern.

Figure 7:
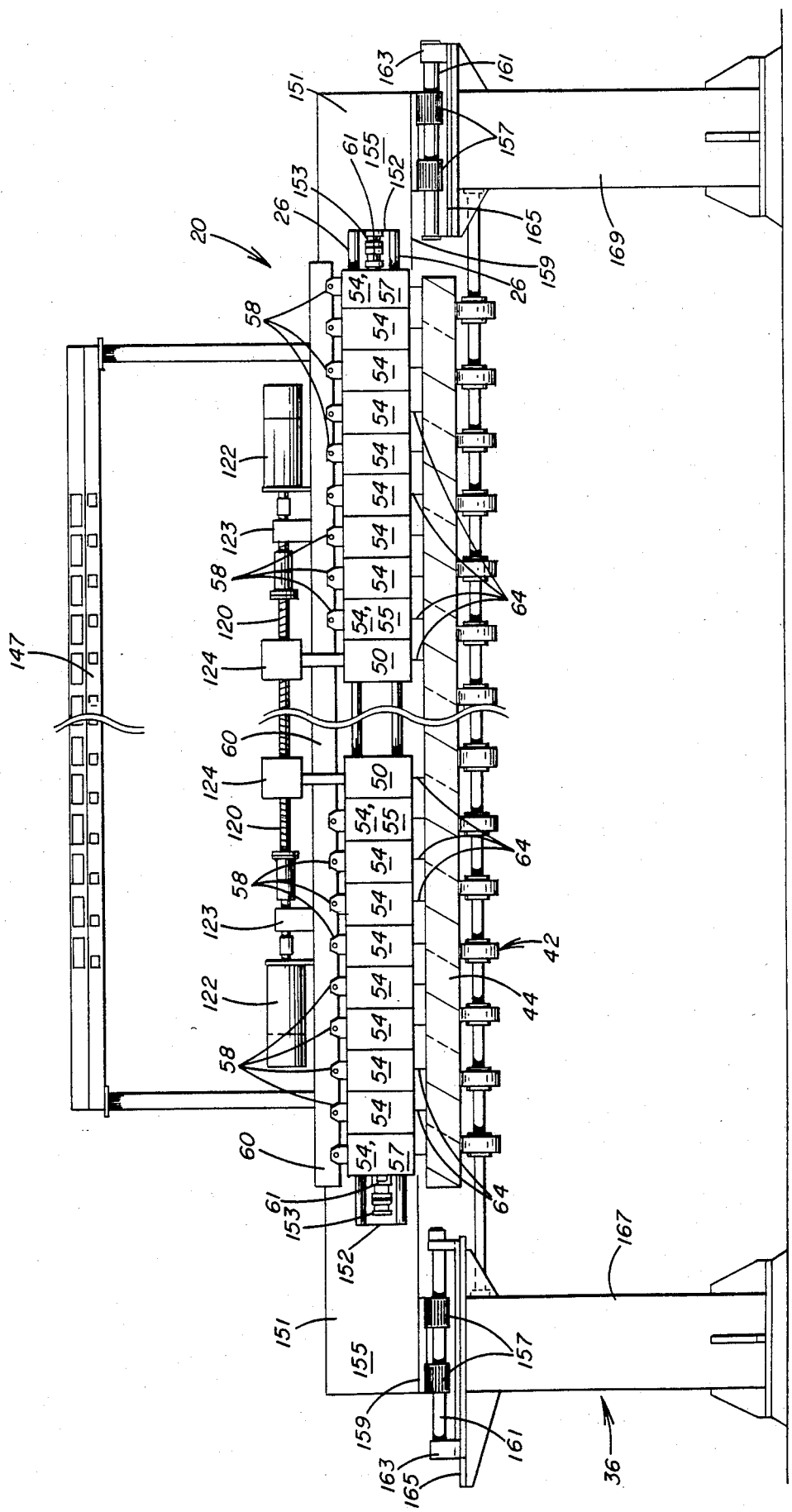
FIG. 7 is a diagrammatic, end, elevational view of an alternative embodiment of the carriage train positioning apparatus of this invention.

More particularly, referring to FIG. 7, the support structure is constructed of a single member 151 having a central cut-out portion 153. The guide/support rails 26 are attached to the end walls 152 of the member 151 within the cut-out portion 153. The brake bar 60 is attached in spaced relation to the front wall 155 of the member 151. A bushing 157 is attached to the underside 159 of the member 151 at each end of the member 151. The bushings 157 are slidably mounted to rods 161 carried by a sub-structure 163 attached to the upper surface 165 of oppositely disposed upright/vertical support members 167, 169 of the conveyor superstructure 36. The carriages 50, 54 may be unitarily moved or shifted by means of a hydraulic, e.g. air cylinder (not shown) or the like, reciprocably driving the member 151 in either direction.

The holding or braking device 58 associated with each trailing carriage 54 preferably comprises a pneumatic caliper brake (not shown) conveniently mounted to a top portion of the associated carriage 54.

The driving facility 52 preferably comprises a ball screw or helically threaded rod 120 conveniently supported for freely rotatable movement at its opposite end portions by suitably bearing blocks (not shown) conveniently mounted to the upper surface of the brake bar 60 or the cross-beam (not shown), and a drive or torquing motor 122 drivingly engaged with the ball screw 120. The motor is preferably a brushless DC reversible motor also conveniently mounted to the upper surface of the brake bar 60, e.g. by means of a motor mounting bracket 123 or the like. A threaded sleeve 124 preferably fixably attached to a generally U-shaped interconnecting member 126 is circumferentially mounted to the ball screw 120 and intermeshedly engaged therewith. The member 126 is also fixably attached to the engine carriage 50. When the motor 122 is actuated, it transmits torque to rotate the ball screw 120, thereby causing the threaded sleeve 124 and the engine carriage 50 connected thereto to move along the carriage movement path 48.

Each cutting assembly 62 and its associated cutting wheel actuating means 66 and scoring wheel 64 is mounted to its associated carriage 22 in any convenient manner such as with nut and bolt assemblies (not shown) or the like. Each cutting assembly, cutting wheel actuating means 66 and scoring wheel 64 is suitably of the type taught in U.S. Pat. Nos. 4,204,445; 4,137,803; 4,220,066, or 4,226,153, all of which teachings are herein incorporated by reference.

Each of the pneumatic caliper brakes 58, the motor 122, each of the electromagnets 110, and each of the cutting wheel actuating means which can suitably be solenoids, are preferably interfaced to the programmable controller 68. The programmable controller 68 can suitably be a MODICON ® 884 controller which is in turn preferably interfaced with a master programmable controller 150, e.g. an ICC 3200 FLEXIBLE AUTOMATION CONTROLLER ®, sold by International Cybernetics Corporation. With this configuration, the MODICON ® 884 controller 68 functions as a slave controller under the automated supervision of the master controller 150, to thereby unburden the master controller 150 from routine tasks. The I/O control monitor 70 is directly linked to the master controller 150 to facilitate input of cutting pattern parameters, etc. thereinto, to be then processed in accordance with the master program which is preprogrammed into the master controller 150, all in a manner as has been amply discussed hereinbefore.

All of the pneumatic/air supply conduits or flexible tubing (not shown) associated with the pneumatic caliper brakes 58 and the flexible electrical wires (not shown) associated with the electromagnets 110 and the cutting wheel solenoids (not shown) can be conveniently suspended from an overhead air and electric supply duct bridge 147 (FIG. 7) disposed above the ball screw 120 to provide operating clearance.

Although a specific preferred embodiment of the present invention has been discussed in some detail herein, it should be understood that many other modifications or variations thereof are encompassed within the spirit and scope of this invention, which should be interpreted solely on the basis of the following claims.

What is claimed is:

1. An apparatus for positioning a plurality of carriages across a work surface, comprising:
   means for supporting said carriages for movement across the work surface;
   an elongated member extending across the work surface;
   means for detachably interconnecting said carriages together to form a carriage train;
   means for driving an endmost carriage along said supporting means to move said train across the work surface; and
   means operatively associated with each of said carriages, except said endmost carriage, selectively actuatable for holding its associated carriage to said elongated member at a preselected position across the work surface.

2. The positioning apparatus as set forth in claim 1, wherein said elongated member is eliminated, and wherein further, each said holding means is selectively actuatable for holding its associated carriage to said supporting means.

3. The positioning apparatus as set forth in claim 1, wherein the work surface supports a workpiece, and wherein further, each of said carriages supports a means for performing a work operation on said workpiece.

4. The positioning apparatus as set forth in claim 3, wherein said workpiece is a glass sheet, and wherein further, each of said work operation performing means comprises a glass cutting means.

5. The positioning apparatus as set forth in claim 3, wherein said driving means comprises:
   a threaded rod;
   a threaded sleeve circumferentially mounting said rod;
   means for attaching said sleeve to said engine carriage; and
   means for rotating said rod in either direction to drive said sleeve and said engine carriage in forward or reverse directions across the work surface.

6. The positioning apparatus as set forth in claim 5, wherein each said holding means comprises a pneumatic caliper braking means.

7. The positioning apparatus as set forth in claim 6, wherein the work surface comprises a conveyor, supported by a conveyor superstructure, for moving said glass sheet along a longitudinal sheet movement path, and wherein further, said elongated member is attached to said conveyor superstructure.

8. The positioning apparatus as set forth in claim 7, wherein said detachably interconnecting means comprises an electromagnetic means selectively actuatable or disactuatable for coupling or uncoupling, respectively, selected adjacent ones of said carriages.

9. The positioning apparatus as set forth in claim 8, wherein said supporting means comprises guide-support rails extending transversely across said sheet movement path.

10. The positioning apparatus as set forth in claim 5, wherein it further comprises means for controlling the operation of said driving means, said detachably interconnecting means, and each said holding means, in accordance with data communicated thereto relating to a desired work operation means configuration, to automatically cause said driving means to drive said carriage train, via said engine carriage, along said supporting means across said workpiece, and to automatically cause said detachably interconnecting means to detach selected ones of said carriages from said carriage train, in a sequential manner beginning with the endmost carriage opposite said engine carriage, at preselected positions across said workpiece, and further, to automatically actuate said holding means associated with each said selected carriage at the same time or just prior to the time its associated carriage is detached from said train, to thereby hold said selected carriages to said elongated member at said preselected positions, and finally, to automatically cause said driving means to stop said engine carriage when it reaches its said preselected position.

11. The positioning apparatus as set forth in claim 3, wherein each said work operation performing means is selectively actuatable for movement between a retracted position spaced from said workpiece and an extended position in working engagement with said workpiece.

12. A method for positioning a plurality of carriages across a work surface, comprising the steps of;
   detachably interconnecting the carriages to form a carriage train;
   utilizing an endmost one of said carriages to move said train across the work surface;
   detaching selected ones of said carriages from said train at preselected positions across the work surface; and
   stopping said train moving endmost carriage when it reaches a preselected position along the work surface.

13. The method as set forth in claim 12, further comprising the steps of:
   providing a member to extend across the work surface; and
   holding said selected ones of said carriages to said member simultaneously with said detaching step.

14. The method as set forth in claim 13, wherein said train moving endmost carriage is directly, functionally connected to a driving means.

15. The method as set forth in claim 14, wherein said work surface supports a workpiece, and wherein further, each one of said carriages supports a means for performing a work operation on said workpiece, and further comprising the step of utilizing said work operation performing means supported by predetermined ones of said carriages to perform a work operation on said workpiece, after said stopping step.

16. The method as set forth in claim 15, wherein said predetermined ones of said carriages comprise said selected ones of said carriages and said train moving endmost carriage.

17. The method as set forth in claim 16, wherein said utilizing an endmost one of said carriages step comprises actuating said driving means to move said endmost carriage connected thereto to move said train across the work surface.

18. The method as set forth in claim 17, wherein said workpiece is a glass sheet, and wherein further, said work operation performing means is a glass cutting means.

19. The method as set forth in claim 12, wherein in said detaching step, said selected ones of said carriages are detached from said train in a sequential manner beginning with the one of said selected ones of said carriages farthestmost from said train moving endmost carriage.

20. The method as set forth in claim 19, wherein said detachably interconnecting step is accomplished with electromagnetic coupling means.

* * * * *